United States Patent [19]

Linsgeseder

[11] Patent Number: 5,680,812
[45] Date of Patent: Oct. 28, 1997

[54] APPARATUS AND METHOD FOR THE EXTRACTION OF VEGETABLE OILS

[76] Inventor: Helmut Linsgeseder, 521 Old Creek Ct., Saline, Mich. 48176

[21] Appl. No.: 376,841

[22] Filed: Jan. 23, 1995

[51] Int. Cl.$^6$ ............ A23N 1/00; B02C 15/00; B04B 5/10
[52] U.S. Cl. .............. 99/513; 100/148; 100/935; 100/37; 99/495; 426/489
[58] Field of Search .............. 99/495, 510, 513, 99/483; 100/117, 127, 145, 148, 149, 935, 37; 426/489, 495

[56] References Cited

U.S. PATENT DOCUMENTS

| | | | |
|---|---|---|---|
| 19,421 | 2/1858 | Helton | 99/513 |
| Re. 31,631 | 7/1984 | McFarland | 99/513 |
| 244,961 | 7/1881 | Wenzel | 99/510 |
| 780,415 | 1/1905 | Eavenson | |
| 1,765,389 | 6/1930 | Wendler | |
| 1,876,064 | 9/1932 | Lang | |
| 1,902,738 | 3/1933 | Tuttle | |
| 2,268,753 | 1/1942 | Kerr | 100/48 |
| 2,935,931 | 5/1960 | Ginaven | 100/149 |
| 3,227,530 | 1/1966 | Levelton | 100/93.5 |
| 3,230,865 | 1/1966 | Hibbel | 100/37 |
| 3,976,001 | 8/1976 | Trovinger | 99/513 |
| 4,373,434 | 2/1983 | Alexander | 100/43 |
| 4,401,023 | 8/1983 | Suhr | 100/148 |
| 4,646,631 | 3/1987 | Ward | 99/483 |
| 4,874,555 | 10/1989 | Upchurch | 260/412.4 |
| 4,901,635 | 2/1990 | Williams | 99/483 |
| 4,944,954 | 7/1990 | Strop | 426/417 |
| 5,041,245 | 8/1991 | Benado | 260/412.4 |
| 5,077,071 | 12/1991 | Strop | 426/417 |
| 5,182,406 | 1/1993 | Coenen | 554/13 |
| 5,200,229 | 4/1993 | Strop | 426/623 |
| 5,351,612 | 10/1994 | Kemper et al. | 100/93.5 |

OTHER PUBLICATIONS

Robert P. Paulik et al., Benefits in Utilizing the Extruder, Inform, vol. 1, No. 3, Mar. 1990 pp. 200–204.

Primary Examiner—Reginald Alexander
Attorney, Agent, or Firm—James M. Deimen

[57] ABSTRACT

An improved barrel extruder for extracting oil from seeds and other vegetable matter comprises a barrel screw that extends a substantial distance from the barrel downstream end and substantially through an extractor head. The extractor head is divided into three sections comprising a screen section and a port section where oil is extracted under extreme pressure and a tip section where the pulp is forced through a narrow gap to provide back pressure to the pulp in the port section. Under the extreme pressure developed in the port section, a substantial portion of the oil content of the oil seed or vegetable matter is extracted from the pulp. The extractor head is configured to permit the screen section and port section and separately the tip section to be easily exchanged for oil seeds and vegetable matter with different pulping characteristics and oil volume or percentage content. The tip section can be exchanged without removal of the extractor head and the other section reached by unbolting and removing the extractor head from the extended extruder screw.

17 Claims, 1 Drawing Sheet

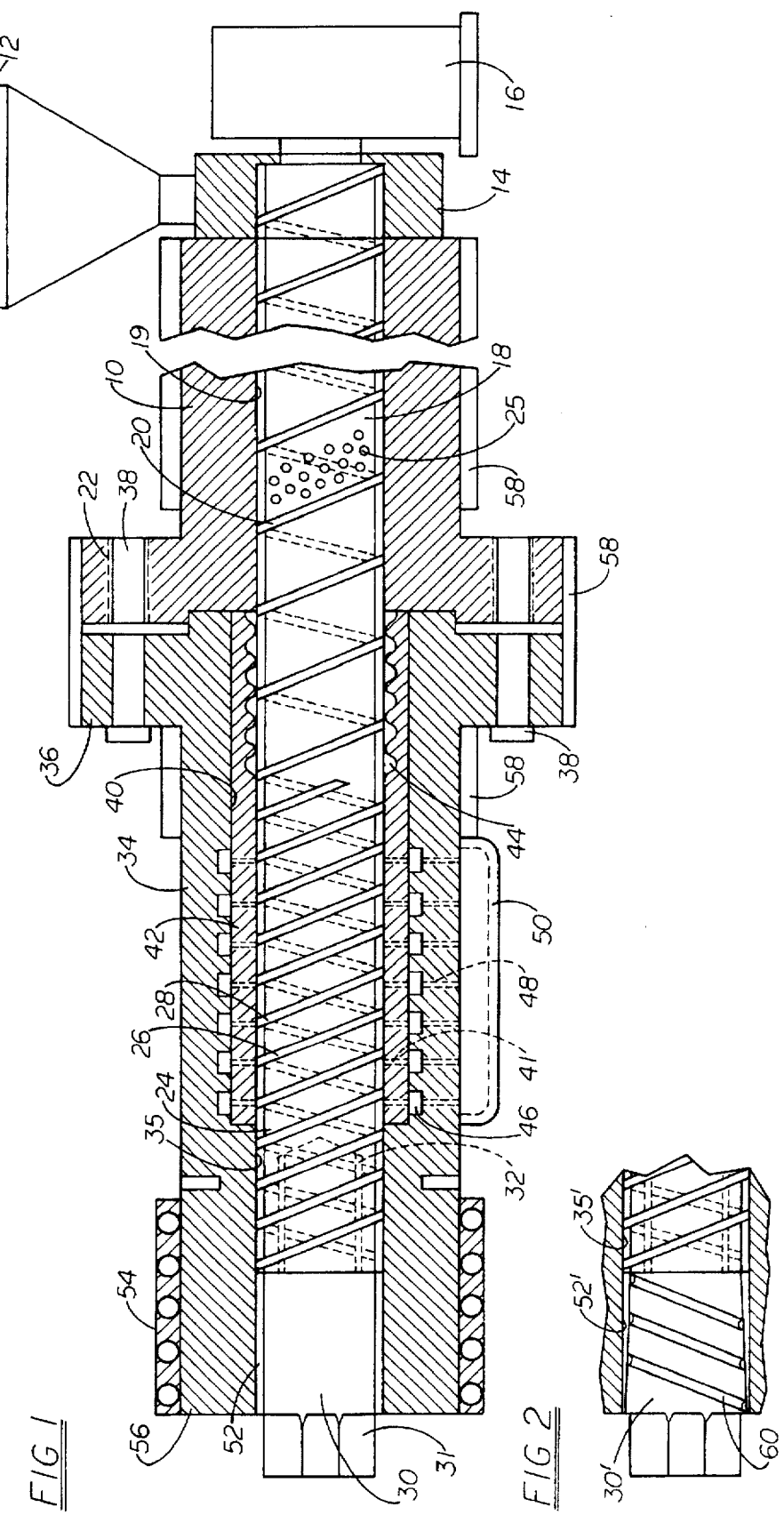

APPARATUS AND METHOD FOR THE EXTRACTION OF VEGETABLE OILS

BACKGROUND OF THE INVENTION

The field of the invention pertains to the extraction of vegetable oils from oil seeds and, in particular, to the crushing and pulping of the seeds in a screw extractor to draw out the liquid from the pulp.

Traditionally, a variety of devices have been used to crush and squeeze seeds to separate the pulp from the oil. In recent years a barrel extruder has been used to extract a first fraction of the oil followed by press or solvent extraction and filter means to extract additional oil. The object has been to produce a pulp with a reduced oil percentage that is suitable as cattle, hog or chicken feed.

Early pertinent patents on devices for extracting liquids are U.S. Pat. No. 780,415 for extracting meat juice and U.S. Pat. Nos. 1,902,738 and 2,268,753 for extracting fruit juice. Each of these devices provide an adjustable valve means to control the flow of pulp extruded from the screw.

U.S. Pat. No. 1,765,389 discloses the use of a perforated plate and U.S. Pat. Nos. 1,876,064 and 3,230,865 disclose adjustable valves all for providing back pressure on industrial materials such as pastes, filter cake and wood pulp as these materials pass through an extruder screw for the extraction of liquids.

U.S. Pat. Nos. 4,373,434 and 4,646,631 disclose extruders wherein sufficient compression heats oil seed pulp which then passes through an orifice. Passage through the orifice causes flashing of moisture in the pulp to steam and consequent disruption of the cell structure of the oil seed. These extruders are intended to prepare the pulp for subsequent solvent oil extraction.

U.S. Pat. No. 4,401,023 discloses a worm press for extraction of oil from oil seeds. Disclosed are internal shoulders for constriction of the pulp mass to increase the percentage of oil extracted in the press and means to adjust the constriction. U.S. Pat. No. 4,901,635 discloses an extruder to process high oil content oil seeds into pellets with voids for subsequent solvent extraction. This extruder is directed to pressures up to 1,000 pounds per square inch and is equipped for changes in perforated die plates to change pellet diameter and back pressure.

The current barrel extruders for processing oil seeds and vegetable crops are generally directed to processing for subsequent solvent extraction of oil and preparation of animal feed as the principal object of the processing. Oil from the extruder is a by-product of the processing.

SUMMARY OF THE INVENTION

The major object of the invention is to maximize the production of oil from oil seed and vegetable crops by increasing the proportion of oil removed from the oil seed or vegetable matter within a barrel extruder to the maximum attainable by crushing and extrusion. The secondary object is a very dry pulp as a by-product. These objects differ from the prior art wherein pulp with a specific oil content is the object and the oil removed is an excess oil by-product.

Oil as the principal object of the processing is becoming more important because oil from oil seeds and vegetable matter can be used directly as a substitute for petroleum based Diesel fuel. After extraction, the oil need only be carefully filtered to remove solids that otherwise would clog engine fuel injectors.

The invention comprises a barrel extruder wherein the rotatable screw extends from the barrel exit by a substantial distance. Attached to the end of the barrel is an extractor head divided into three internal sections surrounding the extended screw. The first section comprises a removable screen section, the middle section comprises a very high pressure port section and the third section comprises the pulp gap section leading to the pulp exit of the extruder.

The entire extractor head may be removed and exchanged when a different oil seed or raw vegetable product is to be processed. The screen section, the port section or the entire screw section may also be changed for processing a different oil seed or vegetable product. In addition, a critical factor in processing to pulp is the pulp gap and this is adjusted by an exchangeable tip on the rotatable extruder screw.

The exchangeability of the screen section, port section and screw tip is to enable the extraction of oil to be maximized and the amount of oil remaining in the pulp by-product to be minimized. The oil content and other physical characteristics of differing oil seed and vegetable crops vary substantially. Moreover, the crushing characteristics at very high pressures and the tendency of the solids to char or otherwise degrade at the temperatures generated within the extractor head also differ for each oil seed or vegetable crop.

To obtain the very high pressure in the extractor head and control the temperature of the oil and pulp, a section of multiple flights are introduced on the screw portion within the extractor head and water cooling means are provided for the extractor head about the screw tip.

To optimize the mixing of the crushed pulp, mixing pins or flight cut-outs may be introduced on the screw in either the extruder barrel or the extractor head, depending upon the characteristics of the oil seed or vegetable product.

DESCRIPTION OF THE DRAWINGS

FIG. 1 depicts a side view partial cross-section of the extruder; and

FIG. 2 depicts a modified exchangeable tip for the extruder screw.

DESCRIPTION OF THE PREFERRED EMBODIMENT

Illustrated in FIG. 1 is an extruder barrel 10 having a loading hopper 12 at the upstream end 14 and means 16 to provide a very powerful rotary drive to the extruder screw 18 in the hollow core 19. The extruder screw 18 is shown with a single flight 20, however, a screw with multiple flights may be substituted.

The extruder screw 18 extends through the length of the barrel 10 and well beyond 24 the downstream end flange 22 of the barrel. The portion 24 of the extruder screw 18 that extends downstream well beyond the flange 22 is preferably of two or more flights 26 and 28, and of equal or decreasing pitch to provide a much increased pressure on the crushed pulp being processed.

At the downstream end of the screw portion 24 is an exchangeable tip 30 attached with a threaded engagement 32 extending into the end of the screw portion. The threaded engagement 32 is either sloped and pitched to self-lock or reversed in relation to the rotational direction of the screw 18 to assure that no inadvertent disassembly can occur during operation of the extruder. Mixing pins 25 are shown on the screw 18 to assist in thoroughly mixing and crushing the pulp. The mixing pins 25 or other supplemental mixing means such as flight cut-outs may be formed in the extended downstream portion of the extruder screw.

Surrounding the extended portion 24 of the extruder screw 18 is an extractor head 34 having a bore 35 therethrough and having a flange 36 at the upstream end for attachment to flange 22 with a plurality of bolts 38. The nut 31 formed on the exterior end of the tip 30 permits the tip to be easily removed and exchanged without disassembly of the extractor head 34.

The extractor head 34 is counterbored from the flange 36 end to provide a circumferential chamber 40 for a ported sleeve 42 with an extractor screen portion 44. The ported sleeve 42 with the extractor screen portion 44 is exchangeable to change port size and screen shape. The ports 41 can be saw slots, slits or holes as desired and the ported sleeve 42 may be formed from a plurality of rings having the ports therethrough. Counterbored into the extractor head 34 are a plurality of circumferential manifolds 46 surrounding the ports 41 in the ported sleeve 42 to gather oil from the ports 41 and lead the oil to external ports 48 and an external manifold 50.

Surrounding the screw tip 30 is a specific circumferential gap 52 in the extractor head 34. The circumferential gap 52 is specifically sized to provide considerable resistance to pulp movement therethrough thereby to provide considerable back pressure on the pulp trapped in the extractor head 34 and maximize the oil forced through the ports 41 of the sleeve 42. The circumferential gap 52 size is adjusted by changing the tip 30 to a tip with a different surface of revolution. The tip 30 as shown is cylindrical as is the gap 52, however, conical or more complex shapes may be substituted for the tip 30 and gap 52.

For most applications, as shown in FIG. 2, the tip 30' is conical and the bore 35' is cylindrical to produce a decreasing gap 52' in the downstream direction. The gap 52' may decrease radially from ⅛ inches to 1/16 inches for a small diameter extruder. However, depending on the application, the gap 52' may be much smaller or much larger. To further generate a highback pressure, a reverse screw formed by a spiral groove 60 in the exterior surface of the tip 30' can be utilized as an option.

Because pressures within the extractor head 34 are expected to reach 10,000 psi just upstream of the gap 52 considerable heat is generated, therefore a cooling jacket 54 for water cooling is provided on the extractor head at the tip end 56 as shown in FIG. 1. Preferably, the tip end 56 is cooled to a temperature that minimizes charring of the pulp passing through the gap 52.

In contrast, because the pressures developed by the screw 18 upstream of the extractor head 34 may not be sufficient to warm the pulp to the best temperature for the release of oil, an insulating blanket and/or electric heating means 58 is provided about the barrel 10 and initial portion of the extractor head.

I claim:

1. A rotating screw oil extractor comprising a barrel having a hollow core and lacing any ports for release of oil, a rotatable extruder screw in the core, loading means in communication with the core and a first end on the barrel spaced downstream from the loading means, the extruder screw having a portion of the screw extending to a second downstream end spaced well beyond the first downstream end on the barrel, an extractor head attached to the first downstream end on the barrel and having a bore therethrough, the extended portion of the extruder screw located in the bore and extending substantially through the bore, means in the extractor head acting in concert with the extruder screw to cause release of oil from oil containing pulp under high pressure approaching 10,000 psi and means in the extractor head to gather the oil from the bore and conduct the oil from the extractor, a tip end on the extractor head, and a tip on the end of the extruder screw in the bore, the tip in the bore forming with the tip end a gap of specified size to cause back pressure on the pulp passing through the bore.

2. The extractor of claim 1 wherein the tip on the extruder screw is detachable from the second downstream end without removal of the extractor head from the first downstream end.

3. The extractor of claim 1 including a plurality of flights on the extruder screw extended downstream portion.

4. The extractor of claim 1 wherein the means acting in concert with the extruder screw comprises a screen in the form of a surface of revolution about a portion of the extruder screw.

5. The extractor of claim 4 wherein the means acting in concert with the extruder screw comprises a cylindrical sleeve having ports therethrough and surrounding a portion of the extruder screw.

6. The extractor of claim 5 wherein the means to gather the oil comprises a plurality of circumferential counterbores in communication with the ports of the ported sleeve.

7. The extractor of claim 5 wherein the cylindrical sleeve comprises a plurality of cylindrical rings having ports therethrough.

8. The extractor of claim 1 wherein the number of flights on the extended downstream portion of the extruder screw exceeds the number of flights on the extruder screw within the core.

9. The extractor of claim 1 including a threaded engagement between the extruder screw and the tip on the extruder screw, the handedness of the threaded engagement being opposite the rotation of the extruder screw.

10. The extractor of claim 1 wherein the pitch of the extruder screw portion in the bore decreases to increase pressure on the pulp within the bore.

11. The extractor of claim 1 including means to cool at least a portion of the extractor head.

12. The extractor of claim 1 wherein the extended downstream portion of the extruder screw includes supplemental mixing means.

13. The method of maximizing the extraction of vegetable oil from vegetable matter comprising crushing and mixing the vegetable matter in a barrel extruder lacking any ports for release of oil, further mixing and maximally compressing the crushed vegetable matter in a separate head located downstream of the barrel and surrounding an extended portion of the extruder screw, said extruder screw formed with continuous flights;

extracting the oil from the crushed vegetable matter at high compression approaching 10,000 psi within the separate head, and further compressing the crushed vegetable matter through a gap in the head configured to cause upstream backpressure in the head.

14. The extractor of claim 1 including a reverse screw formed on the exterior surface of the tip of the extruder screw.

15. The extractor of claim 14 wherein the reverse screw comprises a groove.

16. An extractor head attachable to a barrel extruder for the extraction of oil from vegetable matter comprising an elongate shape having a bore therethrough, said bore adapted to accept an extruder screw extending substantially therethrough to a downstream end;

a tip attachable to the downstream end of the extruder screw, means on one end of the head to attach the head to a barrel extruder and tip end means at the other end of the head formed to provide a gap of specified size with the tip of the extruder screw, means in the head acting in concert with the extruder screw to cause release of liquid from the vegetable matter under high pressure to gather the liquid from the bore and conduct the liquid from the extractor head, and a reverse screw formed on the exterior surface of the tip of the extruder screw.

17. The extractor head of claim 16 wherein the reverse screw comprises a groove.

* * * * *